United States Patent [19]

Kang

[11] Patent Number: 4,509,158
[45] Date of Patent: Apr. 2, 1985

[54] DISC LOADING DEVICE IN A VIDEO DISC PLAYER

[76] Inventor: Seong S. Kang, 394-84 Anyang-dong, Anyang-city, Gyunggi-do, Rep. of Korea

[21] Appl. No.: 461,397

[22] Filed: Jan. 27, 1983

[30] Foreign Application Priority Data

Feb. 13, 1982 [KR] Rep. of Korea .................... 82-628

[51] Int. Cl.³ .......................................... G11B 25/04
[52] U.S. Cl. .................................. 369/77.2; 369/262; 360/133
[58] Field of Search ...................... 369/77.2, 262, 263, 369/270, 271; 360/133

[56] References Cited

U.S. PATENT DOCUMENTS 4,113,262 9/1978 De Stephanis .................... 369/77.2

FOREIGN PATENT DOCUMENTS 2087128 9/1981 United Kingdom ............... 369/77.2

Primary Examiner—Steven L. Stephan
Attorney, Agent, or Firm—Ladas & Parry

[57] ABSTRACT

A disc loading device used in a video disc player in which a turntable is held rotatably at a certain position, comprises a caddy-receiving plate, a driving mechanism, and a linkage mechanism. The caddy-receiving plate has an opening through which said turntable can be protruded and has at both lateral edges a guide means adapted to guide horizontally a caddy into said plate. The driving mechanism is provided at each side of said plate adjacent to a caddy-inserting opening and includes a bracket mounted fixedly to the bottom of a body of the player, a first operating means mounted to said bracket formed with a cam adjacent to said caddy-inserting opening, said cam having an inclined surface facing towards said caddy-inserting opening and contacting with the proceeding end of the caddy at insertion of the caddy, a damper mounted to the connection between said bracket and the first operating means, and a second operating means mounted pivotally to said first operating means and adapted to transmit the movement thereof to the plate. Linkage mechanism is connected to both sides of said plate and driving mechanism and adapted to change a rotational movement from said driving mechanism into an upward and downward movement of the plate, while being maintained horizontally, between a position lifted to be in a common plane with said caddy-inserting opening to permit the caddy to be inserted into the plate and a position lowered to permit the disc to be seated on the turntable at removal of the caddy from said caddy-inserting opening.

1 Claim, 6 Drawing Figures

DISC LOADING DEVICE IN A VIDEO DISC PLAYER

BACKGROUND OF THE INVENTION

1. Field of the Invention

This invention relates to a disc loading device in a video disc player, and more particularly to a disc loading device with a driving mechanism of a simple construction, which is capable of seating the disc on a turntable accurately and stably so as to play the disc and removing easily the disc from the player.

2. Description of the Prior Art

There has conventionally been known a disc loading device used in a video disc player, wherein the spine carrying a disc is held at a certain position by means of a guide and a latch, and a turntable is movable upwardly and downwardly by a lifting means, while being rotatable indirectly via a transmittion means such as a belt. In such a disc loading device, as the turntable rotates indirectly via a transmittion means, the rotation rate thereof is difficult to be controlled accurately, thereby necessitating a precise magnetic sheet. The precise magnetic sheet, however, is expensive to cause the increase of the cost in manufacture. Also, seating of the disc on the turntable by the upward movement of the turntable is carried out manually, thereby causing the inconvenience in the operation thereof. The movement of the turntable also causes to generate slightly a lateral vibration thereof, thereby necessitating an anti-vibration means. In addition, a brake means has to be provided for stopping the movement of the turntable quickly. Accordingly, the increase of the number of parts is unavoidable and causes the device to be large-sized, thereby causing to restrict the appearance and the design of the video disc player, which are important in such household electronic products.

There has been known another disc loading device wherein the turntable is rotatable directly without a transmittion means such as a belt, and the disc is seated on the turntable by the hinge action. In such a device, the appearance and the design are more or less improved, in virtue of reducing the number of parts and a vertical size as compared with the device described above. However, because seating of the disc on the turntable is carried out by placing the spine with the disc carried therein on a frame and inclining the frame by means of a hinge, the spine and the frame are positioned below the turntable, whereby the frame becomes naturally complex in construction. In addition, as the rail means guiding a pickup arm has to be mounted on the side of the device, the increase of a transversal size of the device is unavoidable, thereby causing the increase of the cost in manufacture, as well as the inconvenience in manufacture and assembly.

SUMMARY OF THE INVENTION

A primary object of this invention is to provide a disc loading device which removes the disadvantages of the conventional devices described above.

It is a further object of this invention to provide a disc loading device which is capable of seating the disc on the turntable accurately and stably, and easily loading the disc into the video disc player and unloading therefrom.

It is still a further object of this invention to provide a video disc player which is simple in construction and made of the decreased number of parts, thereby enabling the manufacture and assembly thereof to be easy, being inexpensive, and being compact to provide the improvements of the design and the appearance thereof.

In accordance with this invention, these objects described above is achieved by a disc loading device used in a video disc player in which a turntable is held rotatably at a certain position, said disc loading device comprising a caddy-receiving plate having an opening through which said turntable can be protruded and having at both lateral edges the guide means extended longitudinally and adapted to guide horizontally a caddy into said plate; a driving mechanism provided at each side of said plate adjacent to a caddy-inserting opening and including a bracket mounted fixedly to the bottom of a body of the player, an operating means mounted to said bracket for rotating according to the insertion of the caddy into said opening and formed with a cam adjacent to said opening, said cam having an inclined surface facing towards said opening and contacting with the proceeding end of the caddy at insertion of the caddy, and a secondary operating means mounted pivotally to said operating means and adapted to transmit the movement thereof to the plate; a linkage mechanism connected to both said driving mechanism and the plate and adapted to change a rotational movement from said driving machanism into a upward and downward movement of the plate, whereby the plate is movable upwardly and downwardly, while being maintained horizontally, between a position lifted to be in a common plane with said opening to permit the caddy to be inserted into the plate at insertion of the caddy into said opening and a position lowered to permit the disc to be seated on the turntable at removal of the caddy from said opening.

According to the disc loading device of this invention described above, seating of the disc on the turntable is carried out easily and accurately, while the device is simple in construction. Unloading of the disc player can be also carried out easily and accurately, in that the disc is replaced in position on the plate being lifted when the empty caddy is again inserted through the opening into the body of the video disc player, and then lifted from the turntable.

Operation of the driving mechanism is carried out smoothly according to insertion of the caddy into the opening and removal of the caddy therefrom, by a coupling of simple constitution between the first operating means having a camming surface and the secondary operating means.

In accordance with this invention, the driving mechanism is also provided with a spring means and a damper which are adapted to provide more smooth operation thereof. Accordingly, the upward and downward movement of the caddy-receiving plate is carried out smoothly, thereby preventing the over-driving of the driving mechanism which may result in the demage thereof.

Still other objects and advantages of the invention will become apparent from the following detailed description of the invention when taken in connection with the accompanying drawing in which.

DESCRIPTION OF THE PREFERRED EMBODIMENT

Figure 1:
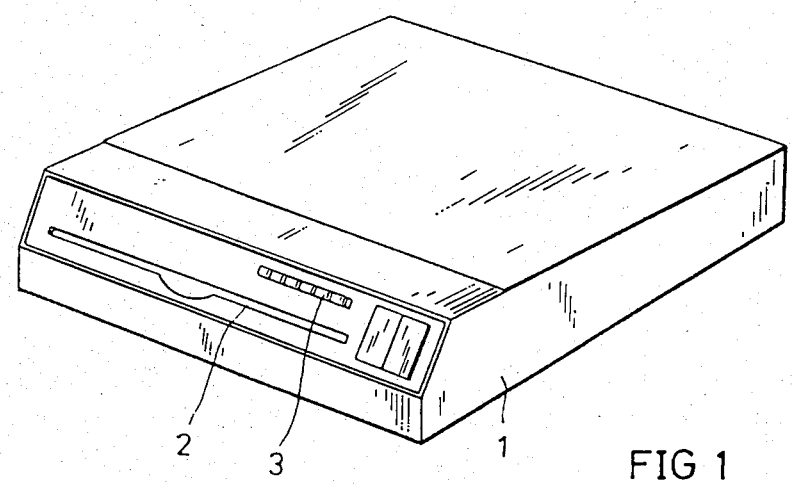
FIG. 1 is a perspective view of a video disc player in which a disc loading device of this invention is used.

FIG. 1 shows a video disc play in which a disc loading device of this invention is used. A body 1 of the player is provided at the front wall with an opening 2 through which a caddy 4 can be inserted into the body 1, and with a group of manipulating switches.

Figure 2:
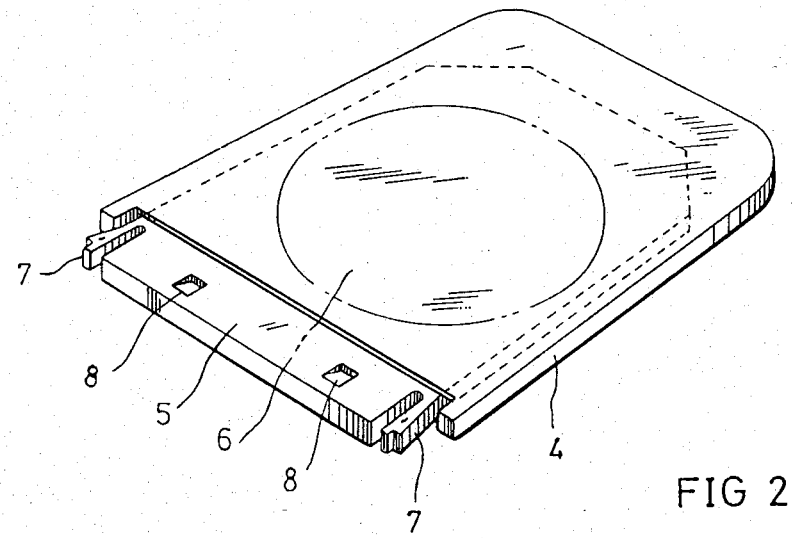
FIG. 2 is a perspective view of a caddy carrying a spine with the disc.

FIG. 2 shows a caddy 4 in which a spine 5 is carried while enclosing a disc 6. Said spine 5 has a pair of biasing elements 7 at both lateral ends, which are forced upon the inside surfaces of the caddy when inserted into said caddy, so that the spine 5 is held in position within the caddy. The spine 5 is also provided with a pair of grooves 8 at the top and bottom surfaces respectively, which engage with the corresponding latches 19 disposed within the body 1, when the spine 5 is inserted into the body. With this arrangement, when the caddy 4 in which the spine 5 and disc 6 are carried is inserted through the opening 2 into the interior of the body 1 so as to play the disc, the grooves 8 of the spine 5 are engage with the latches 19, whereby the spine 5 can be retained in position within the body. As a result, when pulling the caddy 4, it is separated from the spine 5 with the disc 6, and only the empty caddy 5 is removed from the body 1, while the spine 5 and the disc 6 are still retained in the body. Thus, the disc is ready for playing.

Unloading of the disc 6 from the body can be carried out by firstly inserting the caddy 4 through 2 into the body 1 until said spine and disc are fully inserted into the caddy 4, and then pulling the caddy, in which the spine and the disc are carried, from the body.

As shown in FIG. 3 to FIG. 6, the disc loading device in according with this invention comprises a caddy-receiving plate 10 placed horizontally above the bottom of the body 1 and supported movablely upwards and downwards by a linkage mechanism which will be described in detail hereinafter. Said caddy-receiving plate 10 is provided with caddy guides 9, 9', each extending longitudinally along each edge of both sides. Said caddy guides 9, 9' guide a caddy 4 inserted through the opening 2 into the body 1 to be placed in position on the plate 10. Also, the plate 10 has an opening 22 which is of a diameter larger than that of the turntable 12 mounted at a certain position within the body 1, and which is formed at a position on the plate 10 corresponding to the position of the turntable 12 so that said turntable may be protruded upwardly through the opening to initiate playing of the disc.

In accordance with this invention, the disc seating device comprises a linkage mechanism including a plurality of link 11, each of which is connected at the ends to both the bottom of the body 1 and the plate 10 by a support member 1' fixed on the bottom of the body and protruded upwardly therefrom and a support member 10' fixed on the low surface of the plate and protruded downwardly therefrom, respectively. Thus, the plate 10 is movable upwardly and downwardly by means of said linkage mechanism between a position in which the top surface of the plate 10 is in a common plane with the caddy-inserting opening 2 provided at the front wall of the body and a position in which the plate 10 is positioned below the turntable 12, while maintaining horizontally its position.

In a preferred embodiment of this invention, there are two pairs of link 11 in the linkage mechanism, adjacent to both longitudinal ends of the plate 10 respectively. Each pair of link 11 includes two link positioned adjacent to both side of the plate 10 respectively. The support member 10' connecting the plate 10 and a front pair of link 11 close to the caddy inserting opening 2 has a slot 18' into which a pin 18 fixed to a swing arm 16 of the driving mechanism (which will be described in detail hereinafter) is inserted movably as described hereinafter.

The disc loading device of this invention also comprises a driving mechanism provided at each side of the caddy 4 adjacent to the caddy-inserting opening 2, which includes a bracket 15 mounted fixedly to the bottom of the body 1, an operating arm 14 mounted pivotally to said bracket 15 by means of a pin 23 at an extension protruded upwardly from one end, and a swing arm 16 pivoted to said end of the operating arm 14 by means of a pin 16'. From the other end of said operating arm 14 close to the caddy inserting opening 2, an extension as a cam 13 is protruded upwardly and provided at the top end with an inclined surface 13' faced towards said opening 2. Said inclined surface acts as a camming surface which contacts slidingly with the proceeding end of the caddy 4 being inserted through the opening 2 into the interior of the body 1, thereby causing the operating arm 14 to rotate in anti-clockwise in FIG. 3 about the pin 23 as the caddy moves backwardly within the body 1 and contacts at said end with said cam surface.

Figure 3:
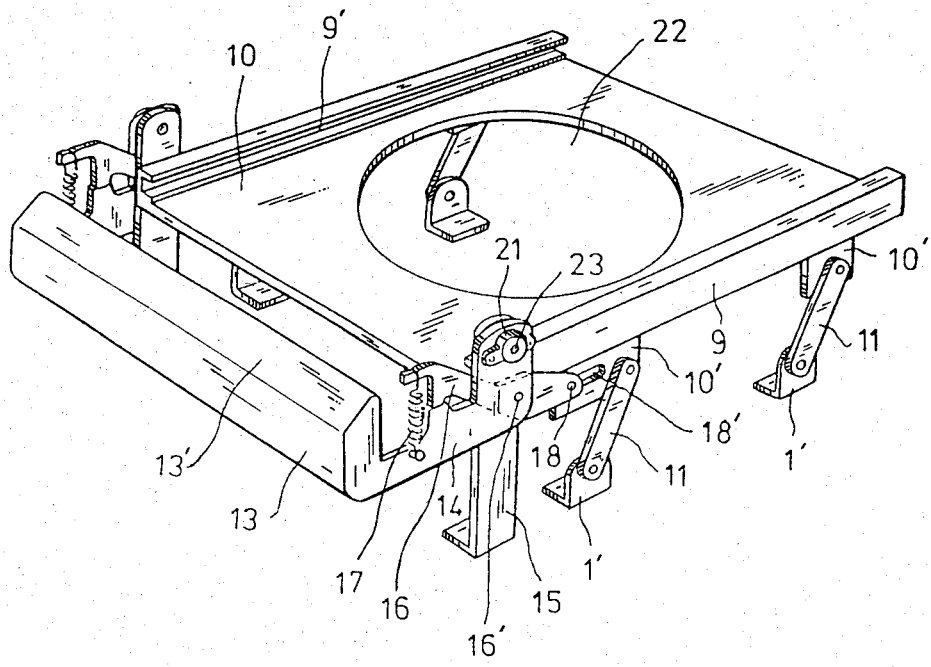
FIG. 3 is a perspective view of a disc loading device in accordance with this invention.

As shown in FIG. 3, the swing arm 16 pivoted to the operating arm 14 by the pin 16' is connected at one end to the operating arm by means of a coil spring 17 and at the other end to the caddy-receiving plate 10 by means of a pin 18 mounted fixedly to said end of the swing arm and a slot 18' formed in a support member 10' connecting the plate 10 and a front pair of link 11.

According to this arrangement, the swing arm 16 acts to transmit the movement of the operating arm 14 caused by insertion and removal of the caddy to the caddy-receiving plate 10. The movement of the operating arm 14 is a rotational movement and changed by the linkage mechanism into upward and downward movement which is transmitted to the plate 10. That is, the swing arm 16 rotates in anti-clockwise about the pin 16' by the tensile force of the coil spring 17 caused by the movement of the operating arm 14, for example, at insertion of the caddy into the body, whereby the linkage mechanism moves to cause the plate to move upwardly.

Now, operation of the disc loading device constructed as above-mentioned will be explained in detail.

Figure 4:
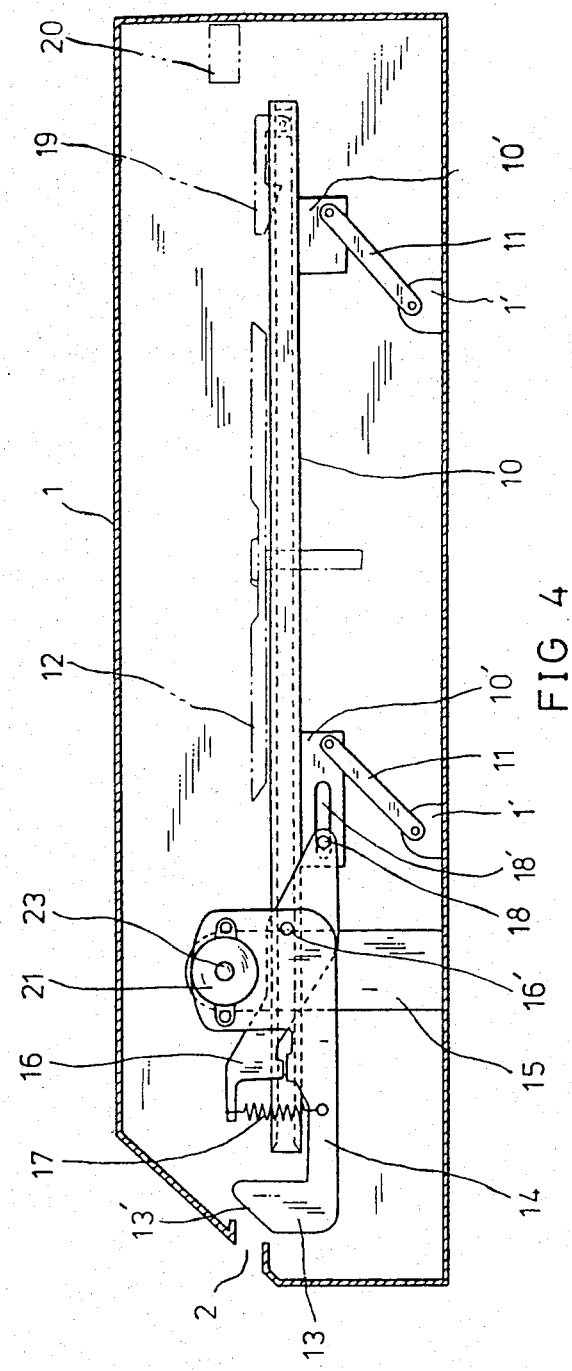
FIG. 4 is a side view partly in section of a video disc player depicted in FIG. 1, showing no playing condition thereof.
Figure 5:
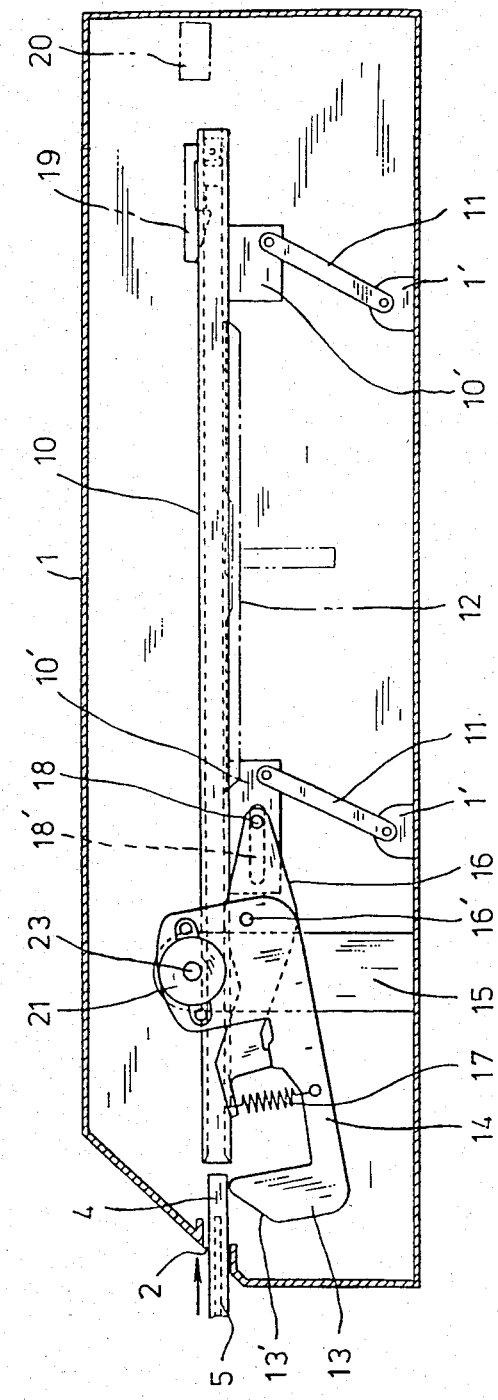
FIG. 5 is a view similar to FIG. 4, showing when the caddy is inserted.
Figure 6:
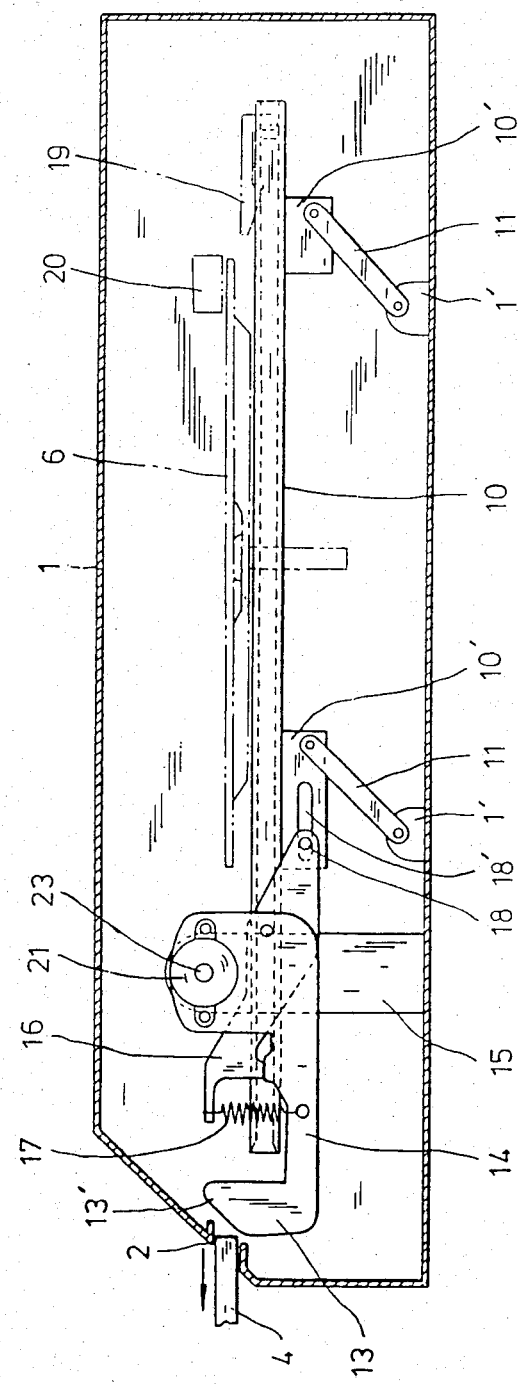
FIG. 6 is a view similar to FIG. 4, showing when the disc is seated on a turntable.

FIG. 4 shows the disc loading device in a no playing condition of the video disc player, wherein the caddy receiving plate 10 is in a position below the turntable 12. In this condition, when the caddy 4 is inserted through the opening 2 into the interior of the body 1, the proceeding end of said caddy is forced upon the inclined surface 13' of the cam 13 as shown in FIG. 5, whereby the operating arm 14 rotates in anti-clockwise about the pin 23 to cause the coil spring 17 to be tensioned, thereby rotating the swing arm 16 in anti-clockwise about the pin 16' by the tensile force of the spring 17. Accordingly, the back end of said swing arm 16 connected to the support member 10' connecting the plate 10 and the front link 11 of linkage mechanism moves upwardly by the rotation of the swing arm in anti-clockwise, while sliding along the slot 18' by means of the pin 18, whereby the plate 10 moves upwardly to a position in which the top surface thereof is in a common plane with the opening 2, while being maintained in horizontal by the linkage mechanism. Thereby, the caddy inserted into the body 1 through the opening 2 can be guided in the caddy guides 9, 9' and moves along the plate 10.

When the movement of the caddy 4 along the plate 10 is completed, the groove 8 of the spine 5 carried in the caddy is engaged with the latch 19 disposed in the plate 10, to cause the spine 5 to be retained in position on the plate 10. At this time, pulling the caddy 4 causes to separate the spine from the caddy. That is, the spine 5 enclosing the disc 6 is held in position on the plate 10 by the engagement between the groove 8 and latch 19, while only the caddy 4 is removed from the body 1. In this manner, removal of the caddy 4 from the body 1 is carried out.

After completely removing the caddy 4 to be departed from the front end of the operating arm 14, the force against the loading of the plate 10, which was provided by the caddy 4, is removed. Hence, the plate 10 moves downwardly and returns to a position below the turntable 12, as shown in FIG. 4, to thereby rotate the swing arm 16 and operating arm 14 in clockwise and return them to the position as shown in FIG. 4. Also, the downward movement of the plate 10 to the lower position causes the spine 5 placed thereon to move downwardly therewith, whereby the disc 6 is separated from the spine 5 by the turntable 12 protruding through the opening 22 of the plate 10, and seated on said turntable. Thus, seating of the disc 6 on the turntable 12 is carried out, and then a playback by the pickup arm 20 can be initiated in a conventional manner.

Unloading of the disc 6 from the video disc player after playing can be carried out in the similar manner as that of seating the disc on the plate. Firstly, the empty caddy 4 is inserted into the body 1 through the opening 2, and then the operating arm 14 and swing arm 16 rotate in anti-clockwise about the pins 23, 16' respectively, thereby moving the caddy receiving plate 10 together with the spine 5 to the upper position in which the caddy 4 can be moved along the plate. During the upward movement of the plate 10, the disc 6 seated on the turntable 12 is again inserted into the spine 5 and lifted from the turntable 12.

When the movement of the caddy 4 is completed, insertion of the spine 5 with the disc 6 into the caddy 4 is completed, and then the engagement between the groove 8 of the spine 5 and latch 19 is released in a conventional manner. In pulling out the caddy 4, accordingly, the spine 5 can be removed therewith, as it is retained in the caddy 4 by the biasing elements 7 forced upon the inside surfaces of the caddy.

According to this invention, a damper 21 is mounted to the operating arm 14 and pin 23 so as to prevent a sudden movement of the operating arm, to thereby dampen the impact upon the driving mechanism, which may cause the mechanical damages thereof, and effect a smooth operation thereof.

In the embodiment of this invention as above-mentioned, the caddy guides 9, 9' are integrally formed on the sides of the caddy-receiving plate. But, only the caddy guides may be formed without providing said plate. In this instance, the caddy guides 9, 9' are connected directly to the linkage mechanism and driving mechanism so as to move upwardly and downwardly, whereby it is able to obtain the same effects as in the above-mentioned embodiment.

In the video disc player in which a turntable is held at a certain position, in accordance with this invention described above, the caddy-receiving plate having the caddy guide is mounted to enable moving upwardly and downwardly in smoothness by the driving mechanism, according to insertion and removal of the caddy. Accordingly, the disc can be seated on the turntable easily, quickly and stably. In addition, the driving mechanism adapted to move the plate is simple in construction, thereby enabling the manufacture and assembly thereof to be easy, being inexpensive, and being compact to provide the improvements of the design and appearance of the video disc player. Furthermore, the use of the coil spring and damper in the driving mechanism enables the mechanical operation thereof to be smooth, thereby preventing the mechanical impacts and damages thereupon to provide a long operating life.

While preferred embodiments of the invention have been described using specific terms, such description is for illustrative purpose only, and it is to be understood that changes and variations may be made without departing the spirit or scope of the following claims.

What is claimed is:

1. A disc loading device used in video disc player in which a turntable is held rotatably at a certain position, comprising;

a caddy-receiving plate having a caddy-receiving plate opening through which said turntable can be protruded and having at both lateral edges a guide means extended longitudinally and adapted to guide horizontally a caddy into said plate;

a driving mechanism provided at each side of said plate adjacent to a caddy-inserting opening and including a bracket mounted fixedly to the bottom of a body of the player, a first operating means mounted to said bracket for rotating according to insertion of the caddy into said caddy-inserting opening and formed with a cam adjacent to said caddy-inserting opening, said cam having an inclined surface facing towards said caddy-inserting opening and contacting with the proceeding end of the caddy at insertion of the caddy, a damper mounted to the connection between said bracket and the first operating means, and a second operating means mounted pivotally to said first operating means and adapted to transmit the movement thereof to the plate;

a linkage mechanism connected to both sides of said plate and driving mechanism and adapted to change a rotational movement from said driving mechanism into an upward and downward movement of the plate, whereby the plate is movable upwardly and downwardly, while being maintained horizontally, between a position lifted to be in a common plane with said caddy-inserting opening to permit the caddy to be inserted into the plate at insertion of the caddy into said caddy-inserting opening and a position lowered to permit the disc to be seated on the turntable at removal of the caddy from said caddy-inserting opening;

said second operating means being connected at one end to said first operating means by means of a coil spring and at the other end to the caddy-receiving plate by means of a pin mounted fixedly to said other end of the second operating means and a slot formed at a support member connecting the plate and the linkage mechanism.

* * * * *